United States Patent
Bollman

(10) Patent No.: US 9,510,402 B2
(45) Date of Patent: Nov. 29, 2016

(54) METHOD AND LED APPARATUS FOR LIGHTING WITH LED LIGHTING CONTROLLER

(71) Applicant: Ringdale, Inc., Georgetown, TX (US)

(72) Inventor: Klaus Bollman, Georgetown, TX (US)

(73) Assignee: Ringdale, Inc., Georgetown, TX (US)

( * ) Notice: Subject to any disclaimer, the term of this patent is extended or adjusted under 35 U.S.C. 154(b) by 495 days.

(21) Appl. No.: 13/946,653

(22) Filed: Jul. 19, 2013

(65) Prior Publication Data

US 2014/0159583 A1 Jun. 12, 2014

Related U.S. Application Data

(63) Continuation-in-part of application No. 12/621,484, filed on Nov. 18, 2009, now Pat. No. 8,922,058.

(60) Provisional application No. 61/115,739, filed on Nov. 18, 2008.

(51) Int. Cl.
*H05B 33/08* (2006.01)
*H05B 37/02* (2006.01)
*H05B 33/00* (2006.01)
*H02J 9/00* (2006.01)

(52) U.S. Cl.
CPC ........ *H05B 33/0815* (2013.01); *H05B 33/089* (2013.01); *H05B 33/0845* (2013.01); *H05B 33/0854* (2013.01); *H05B 33/0863* (2013.01); *H05B 37/0254* (2013.01); *H02J 9/005* (2013.01); *Y10T 307/625* (2015.04)

(58) Field of Classification Search
CPC ....................................... H05B 33/00
USPC ....................................... 307/157
See application file for complete search history.

(56) References Cited

U.S. PATENT DOCUMENTS 8,454,215 B2 * 6/2013 Bollmann ............... G09F 13/16
362/183

\* cited by examiner

*Primary Examiner* — Robert Deberadinis
(74) *Attorney, Agent, or Firm* — Hulsey P.C.

(57) ABSTRACT

A high efficiency LED lighting system with four LED modules. Each module has heat sink assemblies arranged in rows. The heat sink assemblies comprise an LED package mounted on a heat sink reflector. The LED package has a flat find diffusing lens positioned over the diode. A diffusing lens is spaced apart from the heat sink assemblies. A switch mode power supply controller provides power to a pair of light sources. The controller includes a low voltage programmable current source and adjusting elements for independently adjusting the current to the LED light sources. The controller also includes a first communication port for receiving a communication from an external device and a second communication port for sending a communication to a third power supply controller. These ports provide an upstream and downstream communication capability through a chain of controllers so that input from a device can be communicated upstream and downstream.

20 Claims, 16 Drawing Sheets

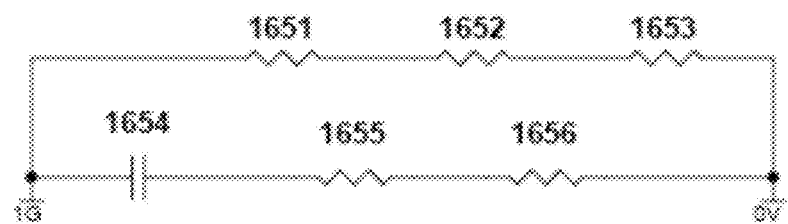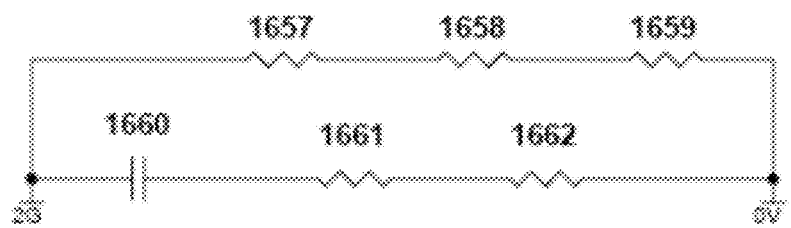
FIG. 13

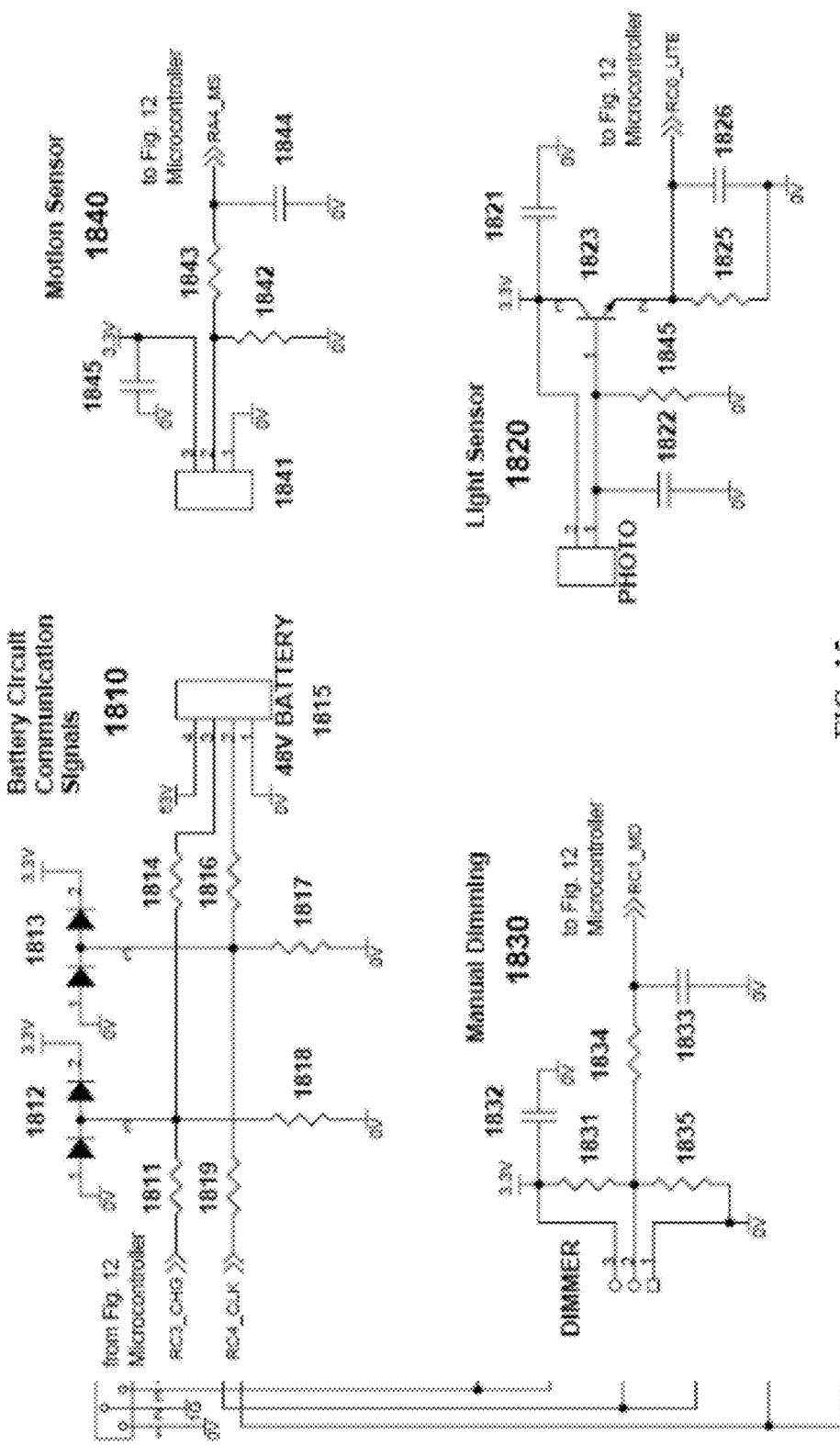

METHOD AND LED APPARATUS FOR LIGHTING WITH LED LIGHTING CONTROLLER

RELATED APPLICATIONS

This continuation is related to U.S. Provisional Patent Application No. 61/115,739 filed Nov. 18, 2008, and claims the priority date of that provisional patent application; and is related to U.S. Provisional Patent Application No. 61/123, 379 filed Dec. 14, 2008. In addition, this continuation is related to U.S. Provisional Patent Application No. 61/225, 629 filed by applicant on Jul. 15, 2009. The above applications are hereby incorporated by reference.

FIELD OF THE INVENTION

The disclosed subject matter relates to installing and orienting LED lighting devices, communicating with LED lighting controllers, controlling LED devices, and methods for designing and fabricating LED devices.

BACKGROUND OF THE INVENTION

LED lighting offers significant maintenance savings as compared to conventional high intensity lights. When properly controlled, LED lighting has a much greater service life than conventional lamps, and LED lighting does not have the intensity degradation of conventional lamps which may lose about 30% intensity in the first three months of operation. Conventional lamps are typically replaced after approximately six months of service.

All LED lighting share the same requirements. However, these requirements are not understood by many of the suppliers in the current market. Significant creative electronic design must be employed to optimally drive an LED and achieve the maximum light output per watt over a large temperature range.

Despite the maintenance advantages, prior art LED devices have not been successful in providing high efficiency solutions which provide compelling economic motivation to replace conventional lighting. Prior art devices use resistors to limit the current, do not monitor the junction temperature of the LED, and take no attention to most details of producing high efficiency lighting. Thus, there is a need for higher efficiency LED lighting systems.

A common example of prior art lighting system may be used for billboard lighting. For a large 14 foot by 48 foot billboard, four metal halide lamp fixtures are used as shown in FIG. 1. Each lamp is typically 400-500 watts. Thus, the total energy requirement may be in excess of 1600 watts.

Another example of a prior art lighting device is the Halophane™ fixture. Its distributor reports that two 400 watt lamps may be used to light a billboard.

The Adtech™ Ecotech™ series LED lights reportedly use a total of 624 watts per billboard side.

One aspect of the current invention is the ability to provide effective billboard lighting with approximately 200 total watts per side. Thus, the current invention provides dramatically higher efficiency than prior art devices. This higher efficiency is achieved with less complex devices than prior art LED lighting products such that the current invention may be sold at prices that approach conventional lighting products. The ability to provide substantially improved energy efficiency, low cost, and long-life LED devices also facilitates the use of solar, wind, or other low energy density power for the lighting devices.

BRIEF SUMMARY OF THE INVENTION

LED devices are designed or selected to permit the effective use of a small number of discrete devices, each serving as an efficient source of light relative to its energy input requirements. Considerations accounted for by the disclosed subject matter include the positioning of the diode(s), the characteristics of the "lens" or diode encasement, and the design of the diffuser.

In one embodiment, the diode(s) are positioned in the middle portion of an LED package relative to the package height as illustrated in FIG. 4. The positioning in this embodiment facilitates a more efficient capture and reflection of available light.

The "lens" or diode encasement may be designed to provide several advantages. In one embodiment, the use of a curved lens which can create non-uniform lighting due to the relative high percentage of light transmitted directly from the diode through the curved lens is avoided. The result of avoiding the curved lens is a fine scattering of the light produced by the LED lighting device.

In another embodiment, a large LED package relative to the diode is utilized to produce a larger light source as opposed to a "point source." A "point source" LED with a curved lens provides a region of high intensity along an axis perpendicular to the lens. This "point source" LED makes converting the light source to a uniform light over a large source difficult, if not impossible. As a consequence, prior art devices tend to have large numbers of relatively small LEDs. This results in a higher cost and reduced efficiency while not entirely solving the problem of non-uniform lighting.

In yet another embodiment, a phosphor diffuser with area much larger than the diode cross section is used. This large phosphor area allows a more efficient capture of available light from the diode and results in a much larger lit area than is possible with a "point source."

In addition to the above disclosed subject matter, the LED lighting system can be used to optimize the reflection of the light based on the intended use of the lighting source. For example, in one embodiment, a reflector may be used to adjust the height of the projected light from 8-14 feet high. An adjustable bracket for varying mounting distance and angle may be used to provide the means for aligning the reflectors to achieve the desired lighting height.

Similarly, the LED lighting system can be used to optimize the refraction of the light as needed. For example, in one embodiment, a diffuser clamp and a second diffuser lens are used. The first diffuser clamp, in good thermal contact with the LED and the housing for thermal management, lessens the "harshness" of the LED lighting source. Such a refractor can reflect or block yellow light which is transmitted from the sides of the LED, while providing a heat sink for the LED lighting system.

These and other aspects of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following FIGUREs and detailed description. It is intended that all such additional systems, methods, features and advantages that are included within this description, be within the scope of the accompanying claims.

BRIEF DESCRIPTIONS OF THE DRAWINGS

The features, nature, and advantages of the disclosed subject matter will become more apparent from the detailed description set forth below when taken in conjunction with the accompanying drawings, wherein:

FIGS. 7-16 are detailed schematics for an example controller

FIG. 7 is a schematic of an RFI filter and surge/overcurrent protection 1100.

FIG. 8 is a schematic of an 85-300 VAC PFC controller 1200.

FIG. 9 is a schematic of a PFC secondary 1300.

FIG. 10 is a schematic of 15 volt buck (SEPIC) power supply 1400

FIG. 11 is a schematic of 15 volt and 3.3 volt switching power supplies

FIG. 12 is a schematic of an LED drive circuit.

FIG. 13 is a schematic of isolated ground references.

FIG. 14 is a schematic of communications circuitry.

FIG. 15 is a schematic of battery backup and microcontroller inputs.

FIG. 16 is a schematic of microcontroller circuitry.

DETAILED DESCRIPTION OF ILLUSTRATIVE EMBODIMENTS

Figure 1:
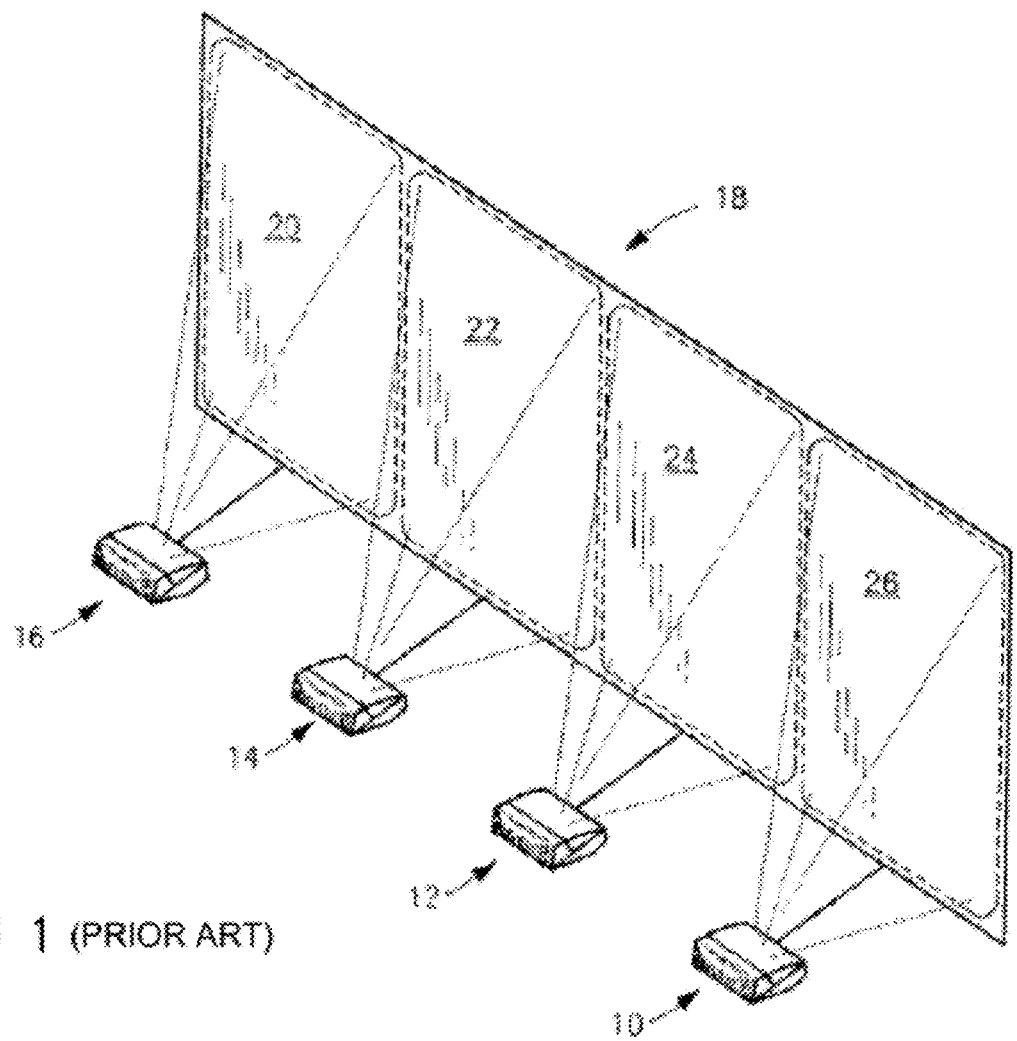
FIG. 1 is an example of a prior art four-module lighting system for a billboard.

Although described with reference to billboard lighting systems, one skilled in the art could apply the principles discussed herein to any number of LED lighting systems and applications.

List of Elements

The following list of elements is provided for convenience:

Lighting module 100, housing 120, reflector holding plate 130, heat sink reflector 150, reflector extension plate 152, bent corner of reflector extension plate 154.

LED package 200, diode 210, phosphor diffuser 220, flat fine diffusing lens 230, diffuser clamp 250, upward-facing fine scattering pattern 252, hold down elements 254, diffusing lens 260, downward-facing fine scattering pattern 262.

Controller 300, batteries 310.

Advantages of Replacing Fixture Rather than Bulbs

Many players in the LED lighting scene propose and sell light bulb, florescent tube, and high pressure sodium fitting replacements. One embodiment of the current invention is the replacement of the whole fitting as the only way to efficiently disperse the heat generated by the LED lighting arrangement in such a way that the junction temperature remains in the sweet spot during prolonged operation.

The most common billboard lighting arrangement is a 480 watt high pressure sodium lamp and a special mirror arrangement designed to provide relatively even coverage of the billboard. The efficiency of the HPS arrangement is approximately 56 lumens per watt when the bulb is new and the spectrum often expressed in temperature is around 5500K (bright white). There is always a bright spot in the center of the field the mirror is aimed at.

Instead of making bulb replacements for billboard lighting, this embodiment is for the making of a replacement fixture. This way, light output limitations of an LED light can be compensated for by providing an ideal operating environment as described in copending patent applications by applicant (U.S. Patent Application Nos. 61/115,739; 61/115,775; 61/115,790; and 61/149,076 which are incorporated by reference to this specification) and optimal light distribution as well as diffusion to eliminate user aversion against too bright light sources.

One aspect of the current invention is to facilitate fast rollout of more efficient lighting technology, where more efficient is defined as the combination of:

No Replacement of Lamps, Tubes, or Ballasts

By using the LED lighting system described herein, there is no need to replace failing or ailing high pressure sodium ("HPS") lamps or fluorescent tubes or their failing ballasts. This in turn reduces the waste of glass, copper, and iron as well as rare gases. In addition, it eliminates the need for safe disposal of mercury laden tubes or bulbs. As long as fluorescent tubes and HPS lamps are the main source of lighting they are being disposed of inadequately and the main source for mercury poisoning of the environment.

No Cleaning of Diffusers from the Inside

Because there is no need to change light bulbs or fluorescent tubes, the diffuser, reflector, and LED carrier can be hermetically sealed, so only the outside of the diffuser needs cleaning.

Diffusion of Light by the LED Lighting System

Diffusing at some distance improves the even distribution of diffused light over the billboard surface without significant reduction in light output by scattering the light better.

Mirrors for Deflection

By adding mirrors for the deflection of light in unwanted areas of the reflector region and directing those light beams to regions of the target area where they can substitute the light intensity a better use of light can be achieved. This further improves the actual light emission in the target areas and compensates for the overall light in the target areas and compensates for the overall light output from the light emitter.

Reduced Lighting System Weight

Overall weight of an LED fitting is less than or equal to an equivalent conventional HPS or fluorescent light fitting reducing the mechanical and wind load on a billboard structure.

Reduced Heat Generation

The lower heat generation will significantly reduce running cost and carbon footprint. The carbon footprint is reduced by approximately 85% compared to HPS lamps or 15% compared to fluorescent tubes. Over a 10 year cycle, HPS lamps have to be replaced every 6 months and fluorescent tubes every 9 months to keep the same high light output while the specific make of LEDs used in this application will retain their full light output (more than 95%) over a 10 year period.

Replacement of Fixture Rather than Bulb/Lamp

In some embodiments, the whole billboard lighting fixture is replaced. This way the electrician can disconnect the old fitting and re-connect the new fitting. By contrast, in bulb or tube replacement technology, where the ballast has to be removed or at least disabled, fittings must be re-wired and/or receptacles replaced, tube or bulb replacements have to be installed. The downsides of inadequate cooling and the resulting low energy efficiency, as well as the need to clean diffusers still exist with bulb and tube replacement.

Advantages of Using an LED Lighting Controller

In order to facilitate flexibility in the number of LED's driven by the controller the presently disclosed subject matter provides the ability to adjust for different voltages and/or current levels. The power source of the presently disclosed subject matter, therefore, may have any combination of the following features:

Power Supply

In one embodiment, the power supply is a switch mode power supply which is power factor corrected. In some embodiments, the power supply provides approximately 53 volts, which is the voltage associated with a bank of four 12 volt batteries.

Programmable Current Source

In some embodiments, the presently disclosed subject matter will include a programmable current source that allows the manufacture of one device for a multitude of LED arrangements.

Power Factor Corrected

In some embodiments, the power factor may be corrected specifically for a particular application, such as street lights, to allow for much lower capacitor and power factor correction requirements from the Utility Providers and their sub-stations.

Power factor corrected lighting devices reduce the cost of sub-stations due to lower need, if any, for large or larger capacitors at the sub-station to compensate for bad power factors by the energy users. This is significant as lighting is a major component of energy usage.

Constant or Pulse Width Modulated

In some embodiments, a constant voltage and current are supplied to the LED lighting system. In other embodiments, the power source may be pulse width modulated to allow the LED to function at its maximum efficiency in all operating conditions. This also elongates the life of the LED element. The pulse width modulation allows the LED to continue to produce light efficiently when being operated at reduced brightness.

Batteries

In this example, a 4-pin battery connector 180 is provided to connect to a bank 80 of four 12 volt batteries. The batteries may be charged or discharged through the connector. The 4-pin connectors has a positive, negative, and two LED connections. The LED connections include a green LED to indicate fully charged and a red LED to indicate status.

Battery Backup

In some embodiments, a battery backup unit ("unit") is utilized. The unit may be used in emergency lighting applications where the unit monitors the supply voltage and switches on the LED when the main power supply can no longer draw current from a battery pack. When power is restored, the light turns off and the battery charger is re-activated.

Energy Efficiency

In some embodiments, the control system provides several approaches to energy efficiency. The LED light source efficiency is optimized through the power supply which provides the proper voltage and current to the diode. This power supply is highly efficient in the manner that it provides current and voltage. The energy efficiency of the controller is 97-98%. This is a dramatic improvement in efficiency. For instance, one prior art device requires a 13 watt input to power a 6 watt LED light source.

Some embodiments of the system may also include one or more digital dimmers to precisely control the LED light sources at desired times or under desired conditions. This current reduction is achieved with a minimal loss of energy efficiency. In one example, the current may be reduced in 2% increments. Individual controllers within a lighting system can be separately controlled by dimmers, photo-sensors, or motion sensors.

Potentiometers

In some embodiments, the power supply is programmable with a first potentiometer 194 for a first LED light source 201 and a second potentiometer 192 for a second LED light source 202. These potentiometers permit an adjustment of the supply current between 400 mA and 900 mA. This allows the use of LED light sources which are common at this time, as well as other types of LED light sources in the future.

Heat Sink Temperature Sensor

In some embodiments, a heat sink and a temperature sensor are incorporated into the disclosed subject matter. The heat sink helps to keep the LED lighting system within its thermal operating range. The temperature sensor may be used to monitor the temperature of the LED lighting system. In some embodiments, the LED may be dimmed resulting in a reduction in temperature when its temperature approaches the upper limit of its rated thermal operating range.

Direct Sensor Control

In some embodiments, an input at the LED lighting supply that connects and powers a motion sensor or occupancy sensor is incorporated.

Direct Dimmer and On/Off Control

In an embodiment in which one light, one switch, or one dimmer is used, the device has a dimmer/switch input powered from the LED lighting supply.

Power Fail Sensing

In some embodiments, a power fail sensor is included. This power fail sensor is used to communicate that a power failure has occurred to the controller.

Daylight Sensor Input

In some embodiments, particularly those in which the LED lighting system operates outdoors, a daylight sensor may be used to control the LED lighting system.

Dimmers, Photosensors, and Motion Sensors

In some embodiments, the power supply includes two provisions for accepting a signal from an external device such as a dimmer 90 or a photosensor 91.

An individual controller, such as controller 101 has connectors to accept a dimmer 90, such as a potentiometer device; a photosensor 91; and a motion sensor 95 such as a Ringdale Motion Sensor #00-27-16090000.

As discussed more fully below, the power supply may also accept the input of a single dimmer 94, such as a digital device, through the communication 1 port and use that single dimmer to dim all LED light sources associated with a series of controllers.

Communication Ports

An LED controller may communicate by wire or wirelessly with other controllers. This permits a single controller to determine or receive an on/off control signal and communicate with the other controllers.

In one example, the communication 1 port 180 includes a 15 volt output that can be used to power a dimmer 90, motion sensor, or other external device.

In one example, the dimmer sets a general power level, which may not be required until a motion detector communicates a presence within an area. Thus, lights can be sequenced to follow an individual down a hallway.

As described below, the communication 2 port 180 of a first controller 101 may communicate with the communication 1 port of a second controller 102 so that a plurality of units may be daisy-chained together. In one example, 8 controllers are connected in such a manner.

Microcontroller and Programming Port

In one embodiment, a custom controller is used. The controller can determine approximate dawn to dusk timing without a calendar. In one example, the controller records dusk and dawn for the 3 days prior to the current day, and turns on the LEDs at dusk, turns them off at midnight, and turns them on 2 hours before dawn. Other timing selections may be made.

The controller has a low voltage (48 volt) connector so that it can run on four 12-volt batteries. The controller has a power factor corrected, switch mode power supply, where the secondary side can be connected directly to a battery to monitor and charge the battery, and can run directly from the batteries. This design permits more efficient battery management for longer battery life.

In another embodiment, each module has a controller. One controller is configured to be a sensor and can communicate with the other controllers by wire or wirelessly.

The controller also includes a programming port for receiving instructions to a microcontroller 120, such as a Ringdale microcontroller. The microcontroller may be programmed with an external computer 1001 through port 110. Each controller has a unique MAC address, thus it is possible to remotely control each controller device.

Daisy Chaining of Controllers

Figure 2:
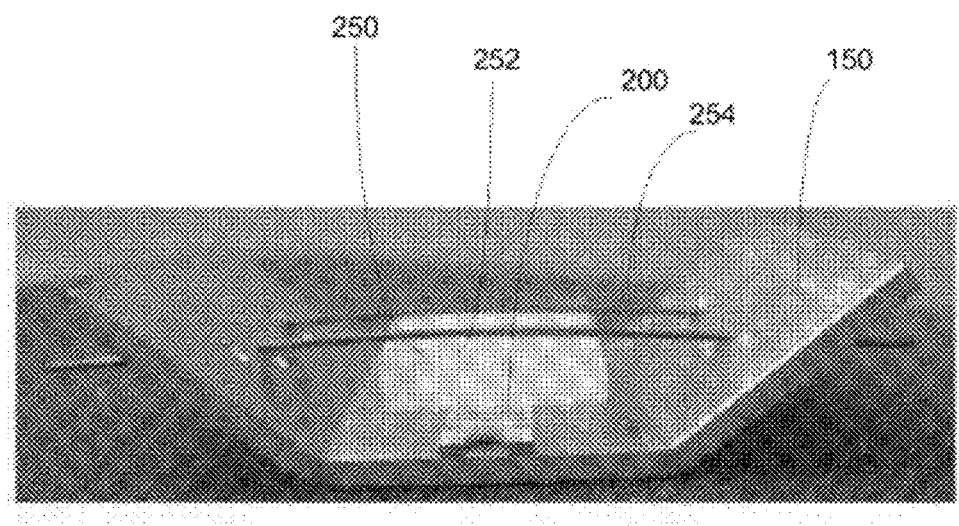
FIG. 2 is a side view of an example diffuser clamp. (Note that this figure shows a symmetric reflector rather than an asymmetric billboard reflector)

FIG. 2 is a schematic showing three controllers 101, 102, and 103 in series where controller 101 supplies power to LED light sources 201 and 202; controller 102 supplies power to LED light sources 203 and 204; and controller 103 supplies power to LED light sources 205 and 206.

Each controller includes a first communication port 80 which may accept a signal from a source such as an external device such as an electronic dimmer or a motion sensor; an Ethernet connection; or a wireless adapter such as a Ringdale model no. 00-27-16190000 wireless adapter.

Each controller also includes a second communication port 82, which is typically used to daisy chain a series of controllers together as illustrated in FIG. 2. In this example, communication 2 port 82a of controller 101 is connected to communication 1 port 80b of controller 102; and communication 2 port 82b of controller 102 is connected to communication 1 port 80c of controller 103. This chaining permits a single wired or wireless instruction to be communicated to all of the controllers and reduces communications wiring or complexity. The chaining also permits a single dimmer to direct all controllers 101, 102, and 103.

Each controller may have a dimmer, photosensor, and/or motion sensor that instructs that controller to override the general instructions provided through the daisy chain.

Networkable In/Out (150 Feet Distance)

One LED Lighting Supply can communicate with two neighbors through a proprietary communication link and protocol. The communication is potential free so that ground loops will not affect communication reliability or cause a danger to installation or maintenance personnel. Communications received on one port are repeated out of the opposite port so that communications can be relayed to multiple units.

Rating Label

Some embodiments of the LED lighting system are intended to satisfy the requisites to obtain a UL or CE label. Those embodiments which qualify for a UL listing can be treated as a low-voltage device on all LED arrangement current outputs as well as on the communication and dimmer inputs. Those embodiments which satisfy the requisites to obtain a UL or CE certification will have the label display within the requirements of outdoor or indoor lighting fixtures.

Multiple Applications

Several applications for the presently disclosed subject matter are possible. These applications include, but are not limited to, office lighting, path lighting, street lighting, accent lighting, and billboard lighting.

Capital and Maintenance Efficiency

The control system also provides advantages in capital efficiency and maintenance efficiency. A common controller design can be used for a variety of incoming voltages, so that the controller may be produced in high volume to reduce cost, and so that further efficiencies may be obtained through the reduction in the number of components. A common device, with a single UL approval is provided, so that there is not an approval delay in providing new applications based on the controller. The number and complexity of auxiliary devices, such as dimmers, is greatly reduced relative to prior art design. For example, in the case of a church, prior art dimmers would typically require multiple synchronized thyristor dimmers; while one embodiment of the current invention could use a single inexpensive digital dimmer to control a plurality of daisy-chained controllers. The capital and installation costs of communications wiring is reduced through the chaining of controllers so that instructions to a first controller may be relayed to downstream controllers.

Figure 5:
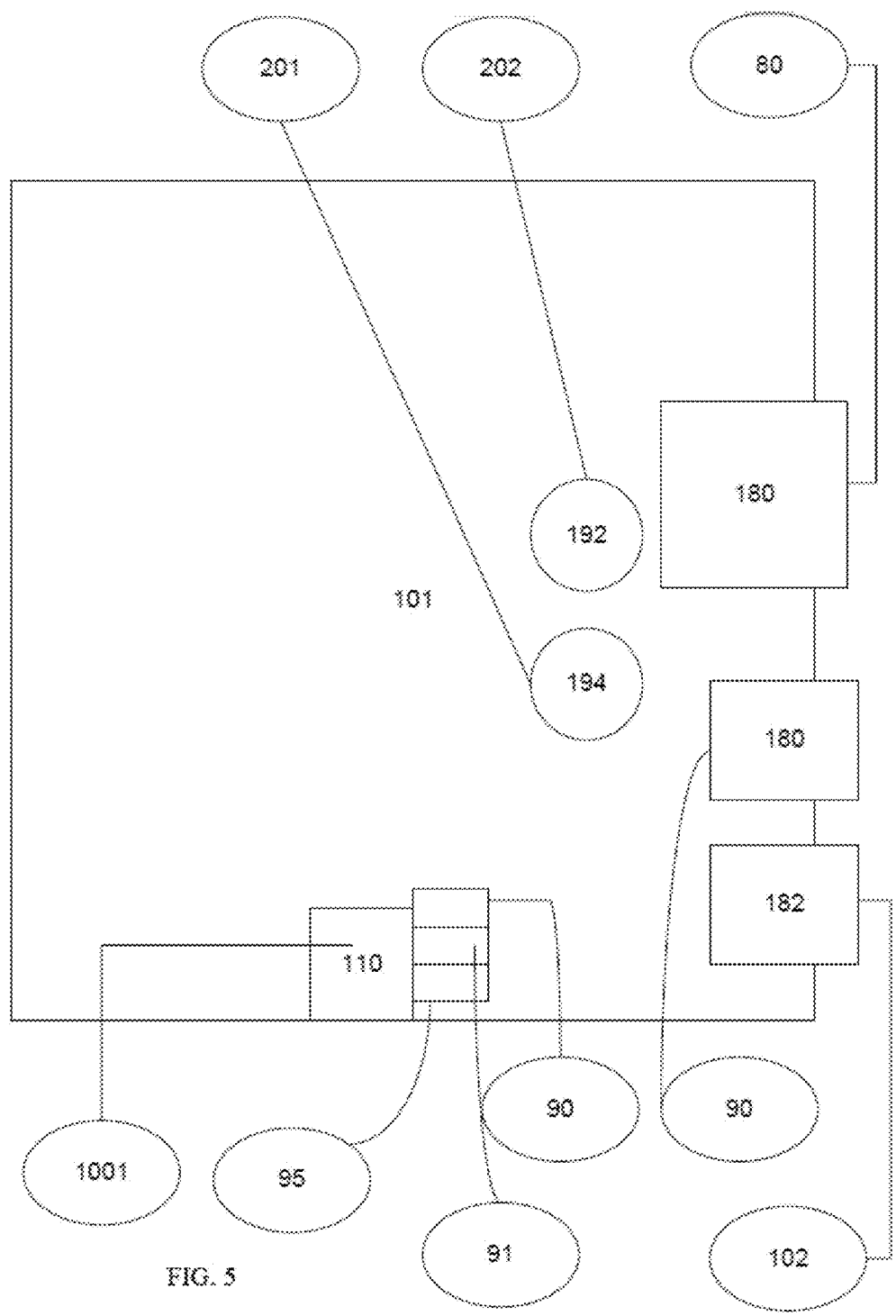
FIG. 5 is a schematic illustrating a portion of the functionality, external inputs, and communication of a controller board.
Figure 6:
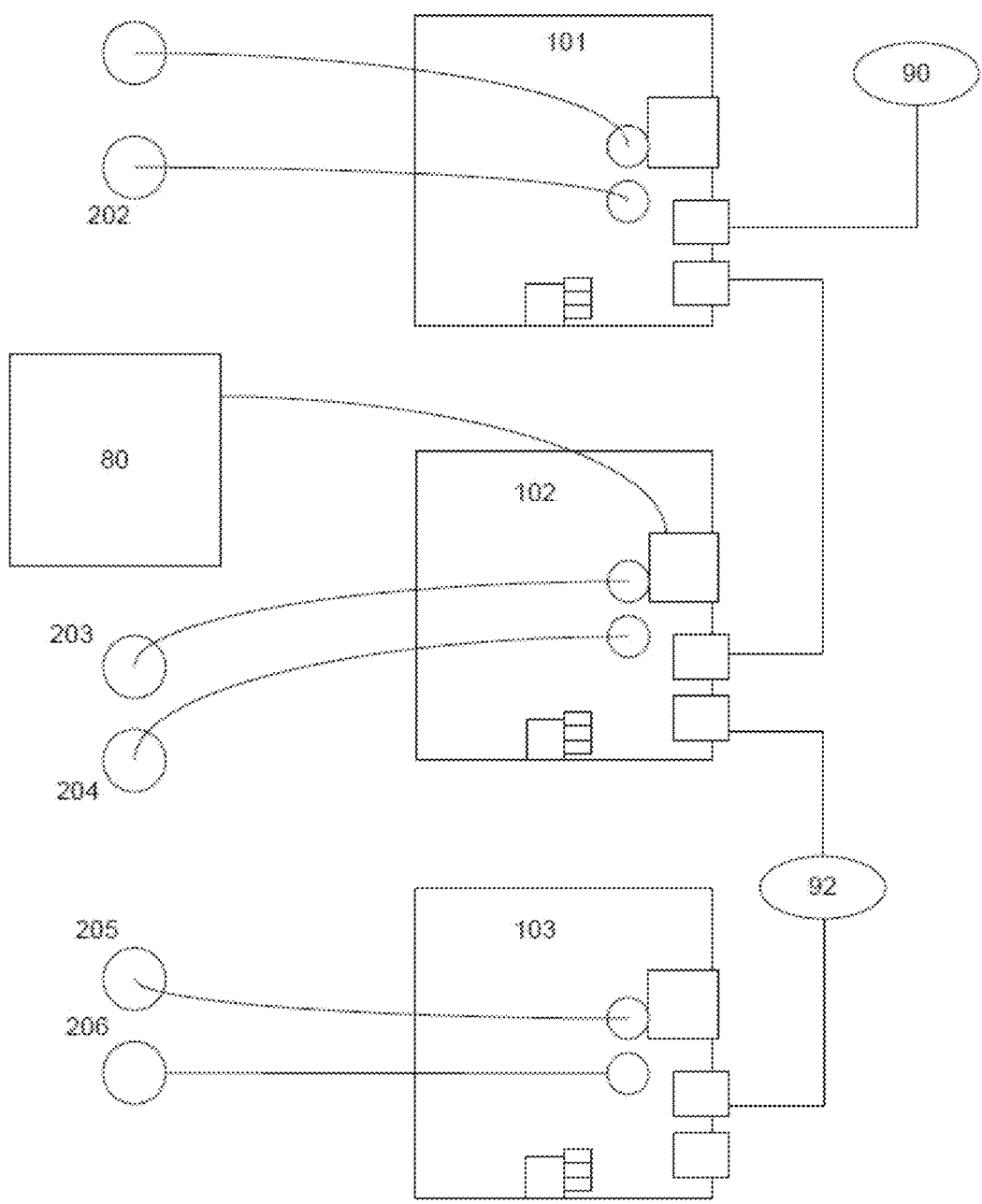
FIG. 6 is a schematic showing three controllers in series.
Figure 7:
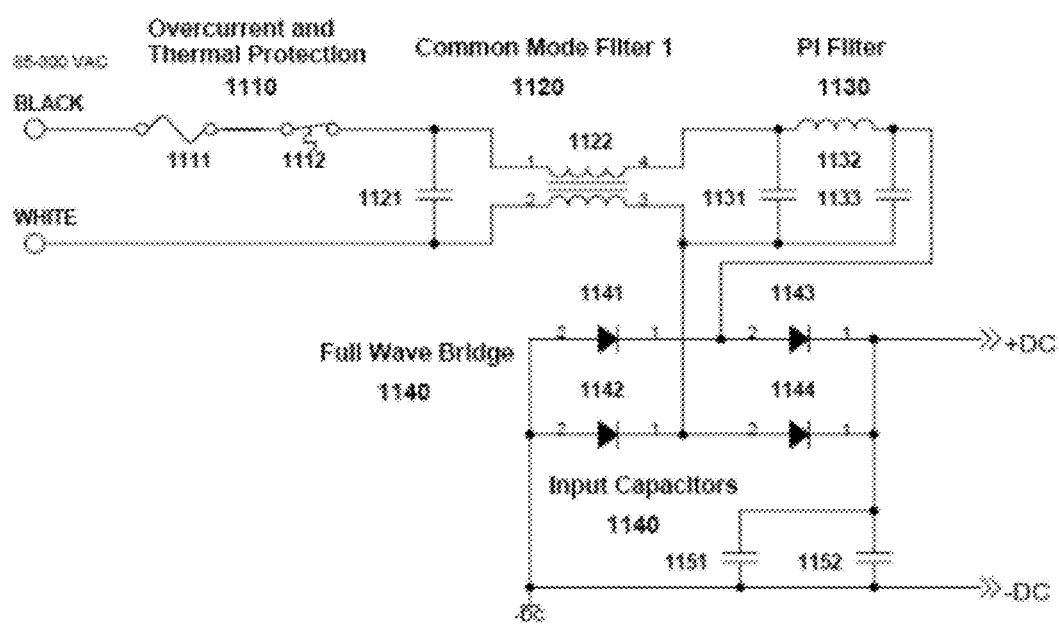
Figure 8:
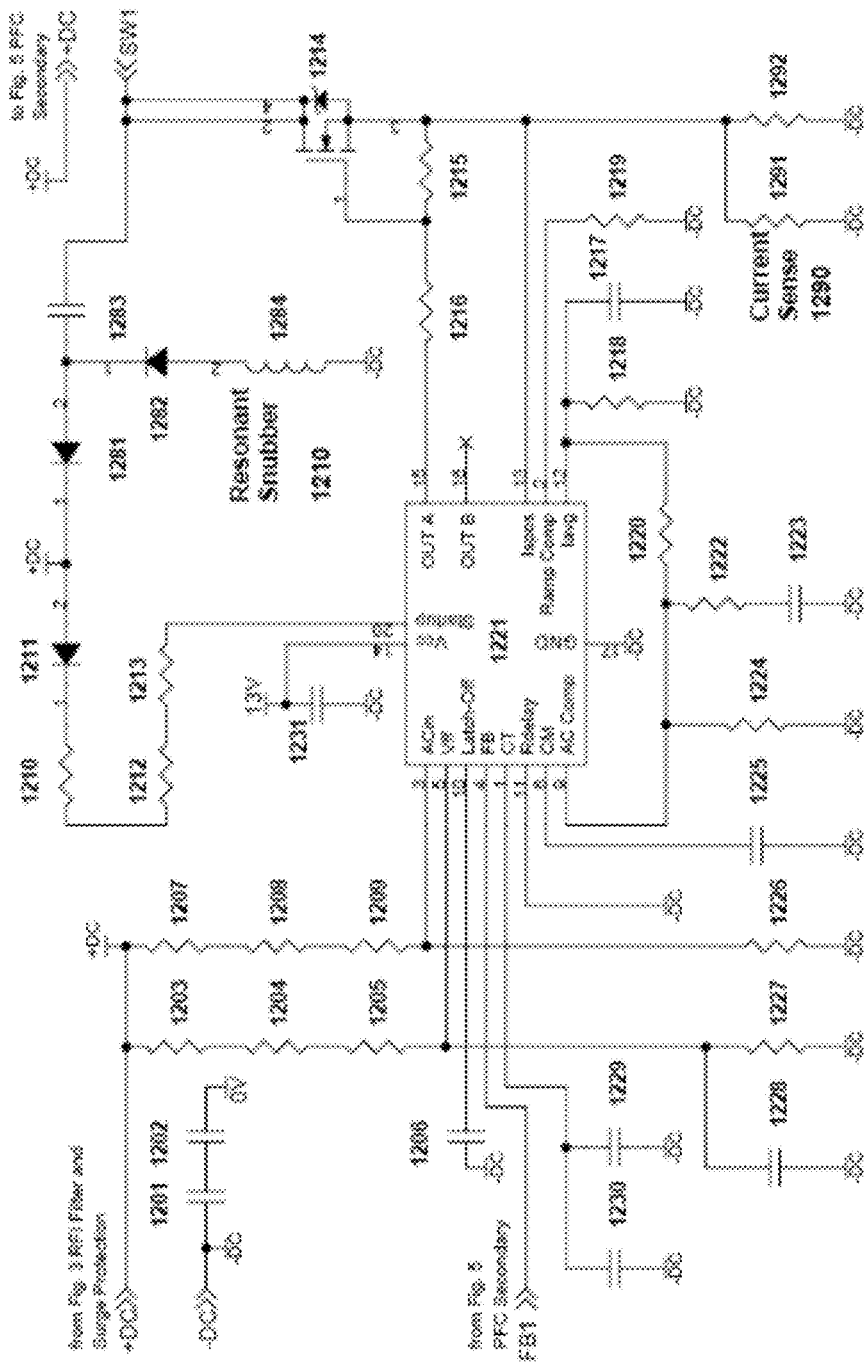
Figure 9:
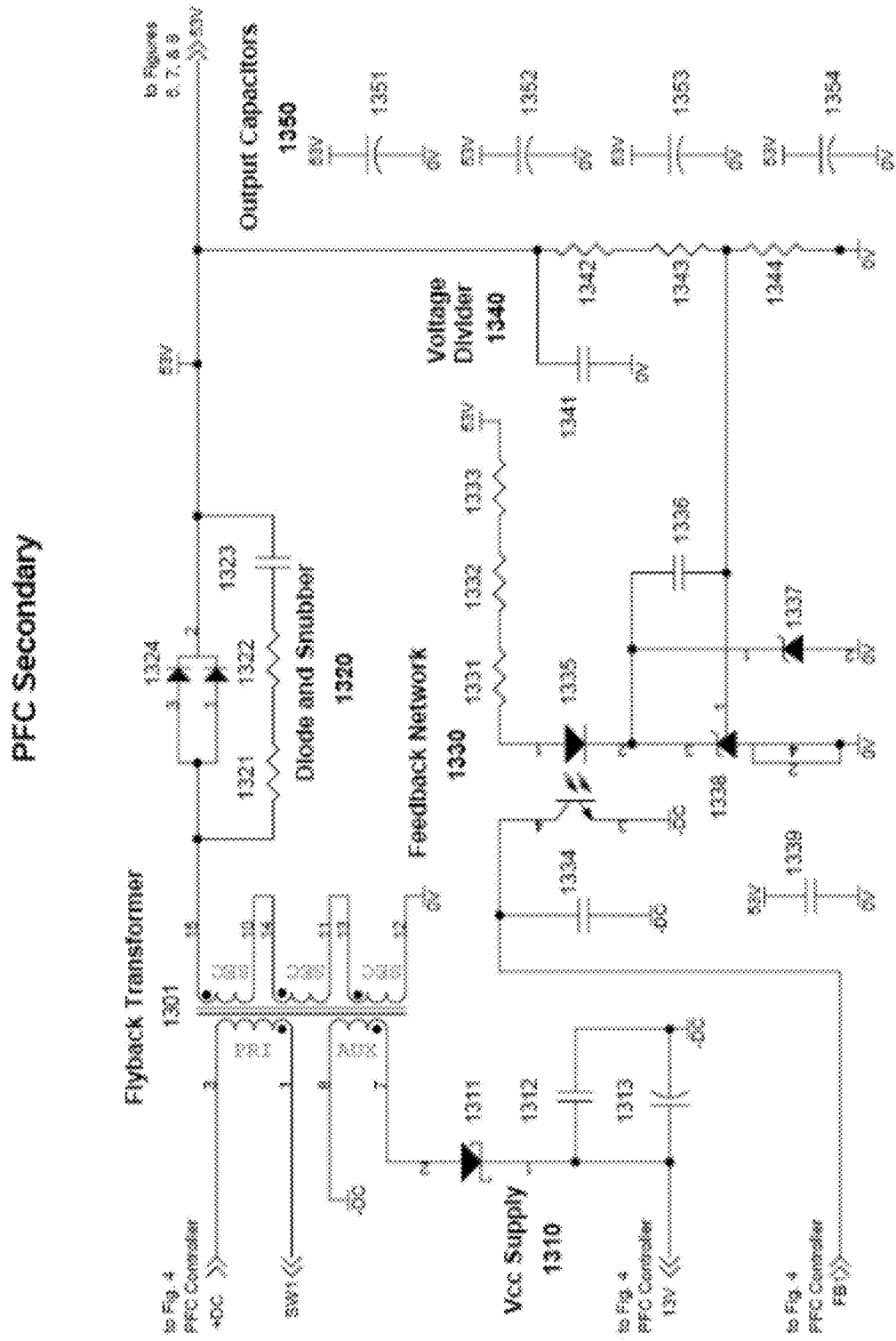
Figure 10:
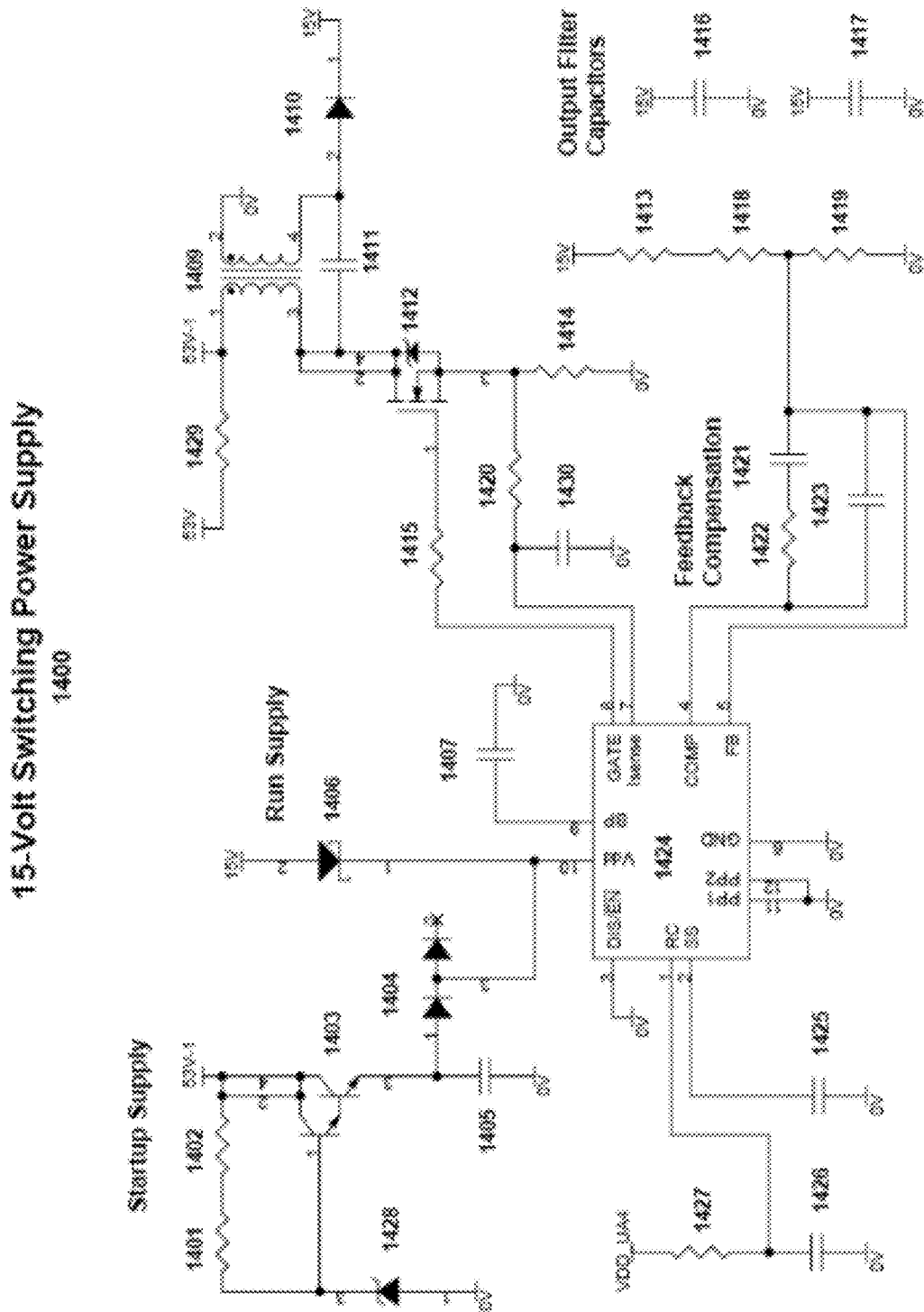
Figure 11:
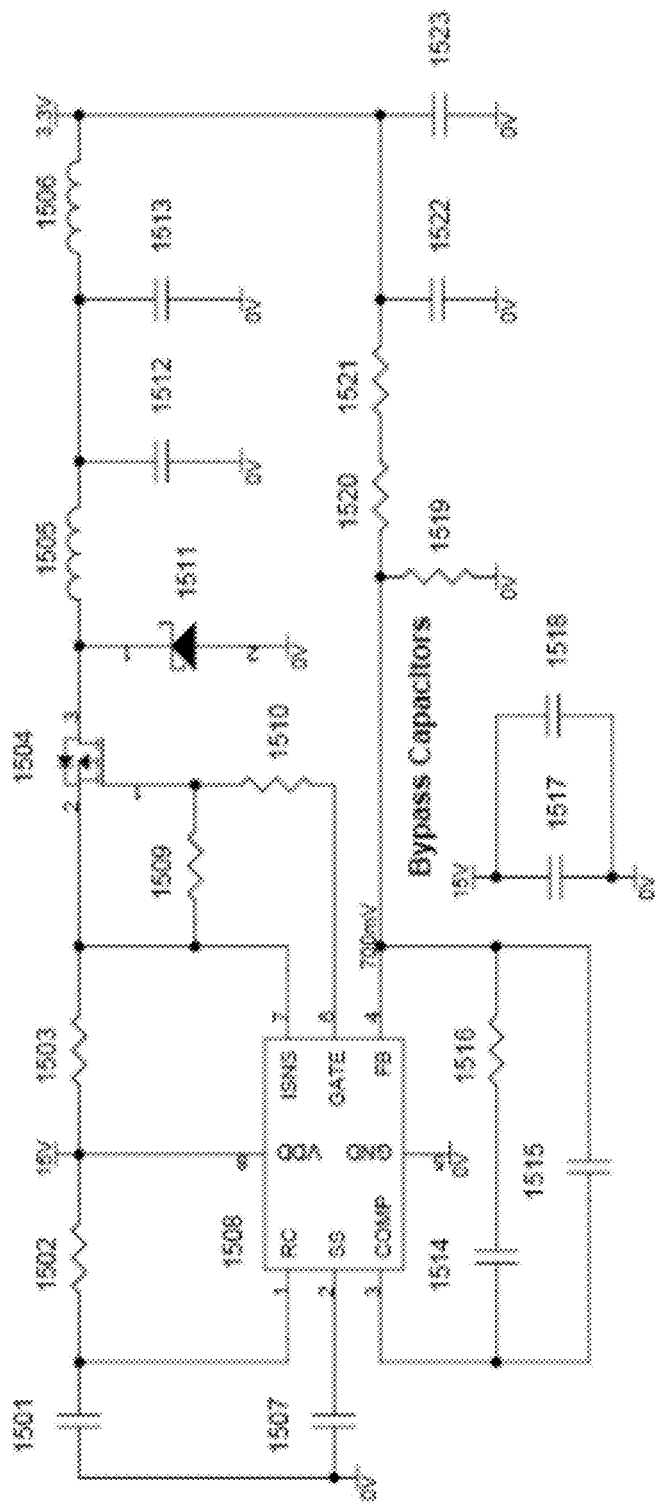
Figure 12:
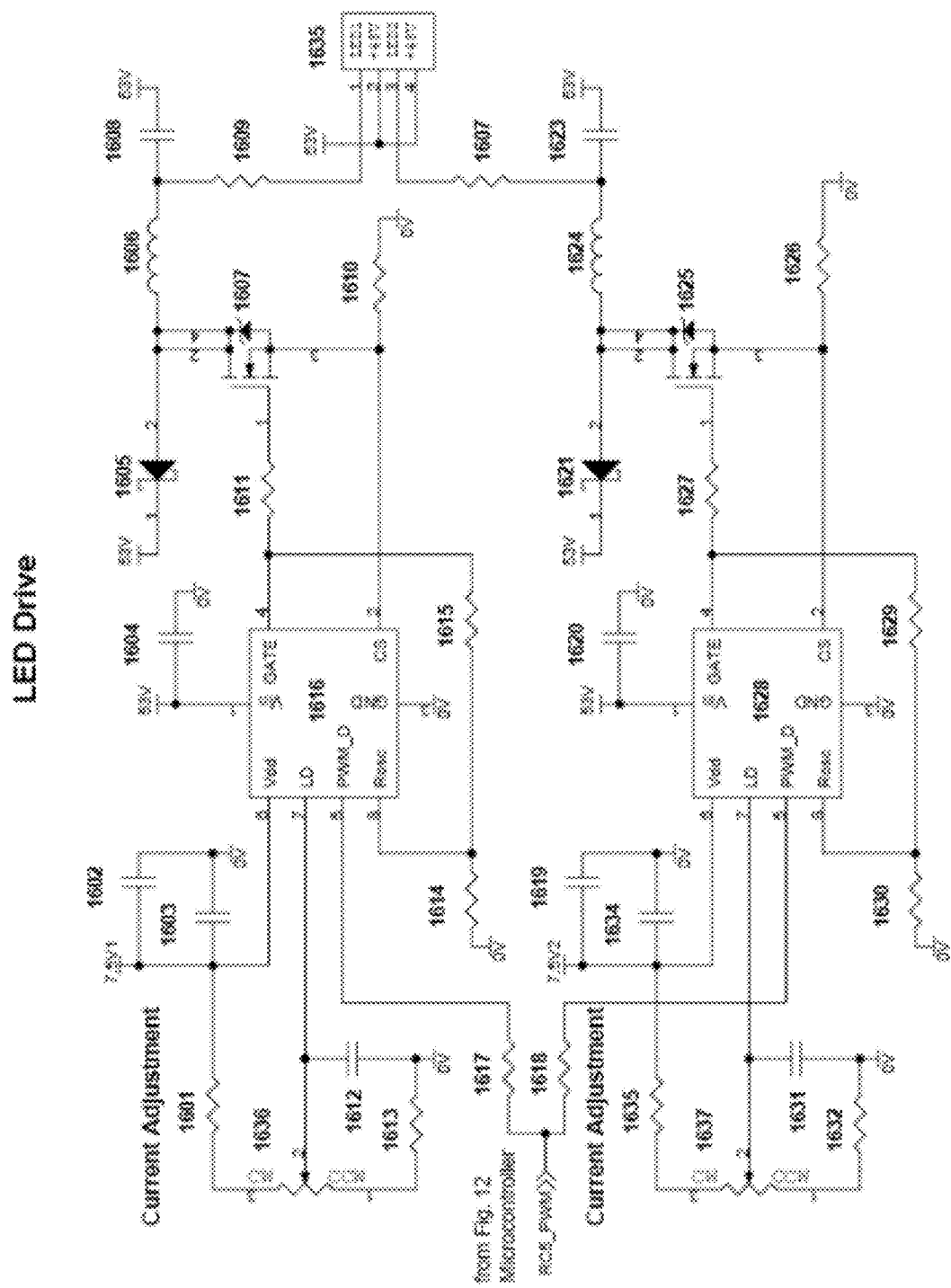
Figure 16:
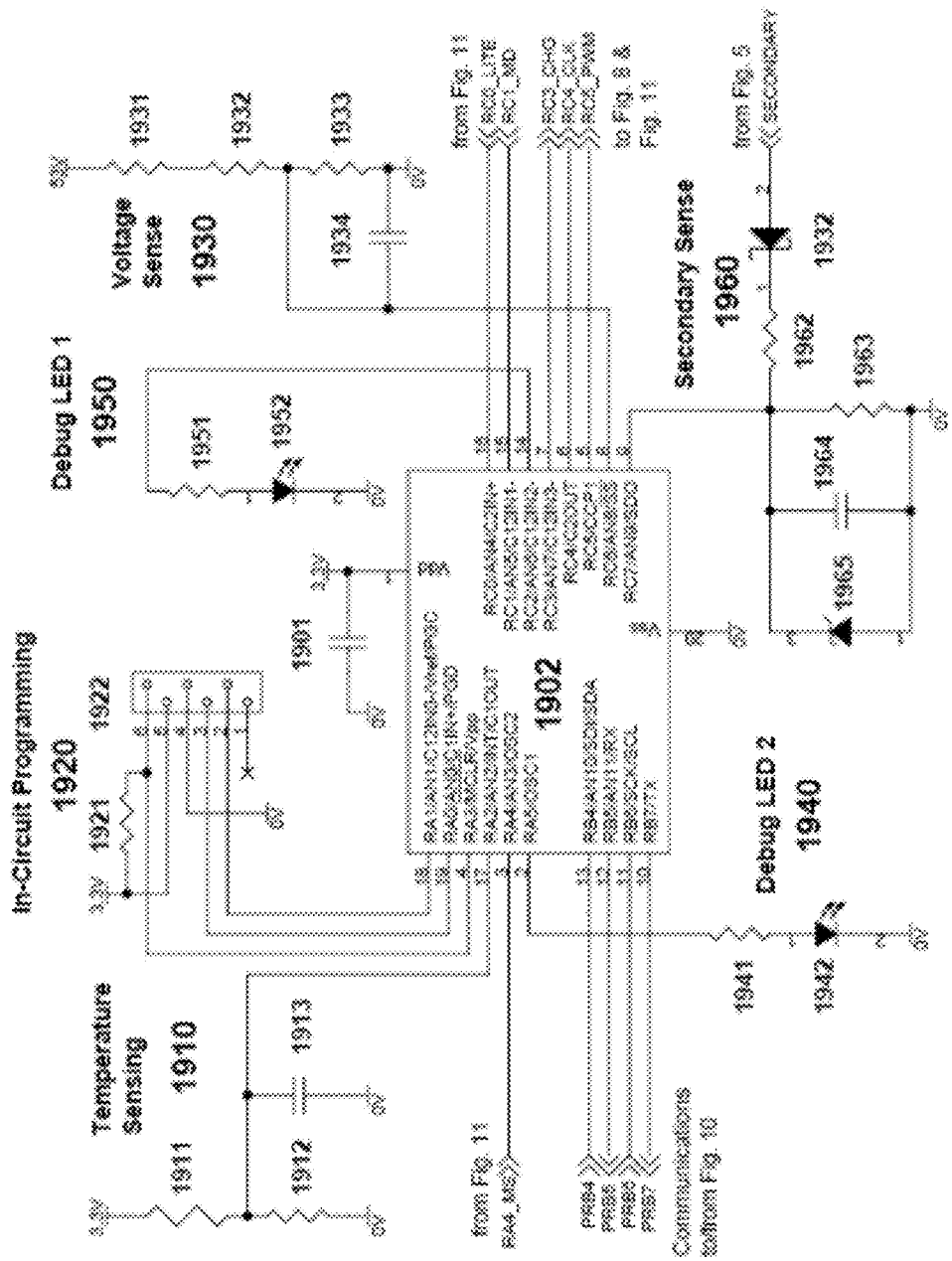

FIG. 5 is a schematic illustrating a portion of the functionality, external inputs, and communication of a controller board 101. In this example, the controller accepts an incoming power supply (not shown) of approximately 90-300 volts, and provides power to LED light sources 201 and 202. In one example, the supply is rated for 90 to 300 VAC so that it may be used with 120-volt, 208-volt, 240-volt, 277-volt systems, and other similar systems.

Illustrative Example—First Side Lighting System

In this illustrative example, one side of a billboard is illuminated with a first side lighting system comprising four lighting modules 100. The second side of the billboard may be illuminated with a second side lighting system also comprising four lighting modules. While this example is illustrative of a contemplated embodiment of the presently disclosed subject matter, other embodiments are included in the scope of this disclosure.

Design Methods

Some aspects of the design methods include, but are not limited to:

LED devices are designed or selected to permit the effective use of a small number of discrete devices, each serving as a very efficient source of light relative to its energy input requirements.

Figure 4:
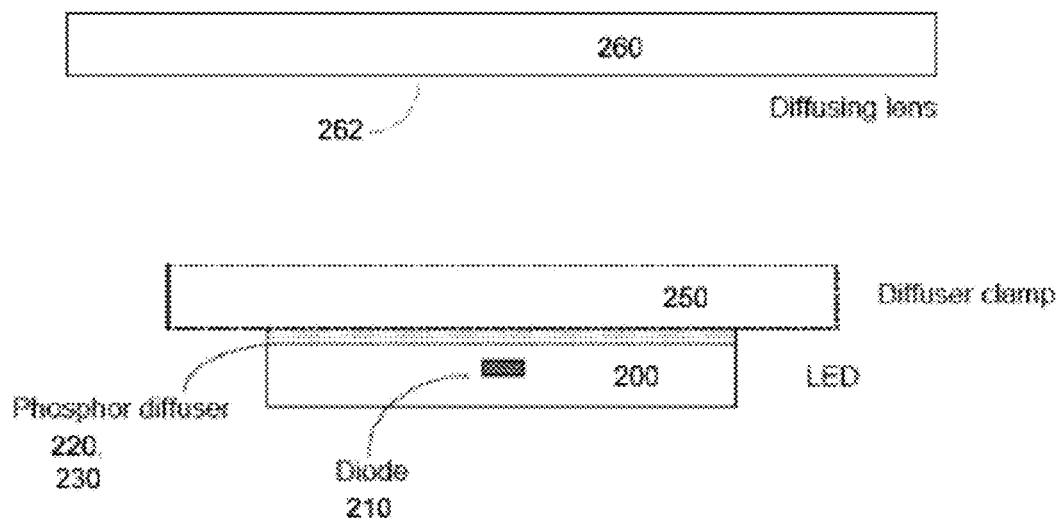
FIG. 4 is a simplified cross section of an example embodiment showing an LED, a diffuser clamp, and a diffusing lens.

Considerations for this LED design or selection include, but are not limited to:

A preferred positioning of the diode(s) in the middle portion of an LED package relative to the package height as illustrated in FIG. 4. This positioning facilitates a more efficient capture and reflection of available light; and A preference for a "lens" or die encasement that avoids the use of a curved lens which can create non-uniform lighting due to the relative high percentage of light transmitted directly from the diode directly through a curved lens; and Provides a fine scattering of light; and Provides a relatively large LED package relative to the diode. This large packaging contributes to a larger light source versus a "point source" LED. A "point source" LED with a curved lens provides a region of high intensity along an axis perpendicular to the lens; and it is not possible to convert this light source to a uniform lighting over a large area. As a consequence of this effect, prior art devices tend to have large numbers of relatively smaller LEDs, and therefore have higher cost, lower efficiency, and still have problems delivering a uniform light pattern for billboards. As described below, an example embodiment of the current invention for a 48 foot wide billboard uses 48 LEDs versus 1200 LEDs for a prior art device; and Providing a diffuser having a phosphor diffuser area much larger than the diode cross section. In one example described below, the phosphor area is about 10 times larger than the diode area. This large phosphor area permits a more efficient capture of available light from the diode and presents the LED as a much larger area than a point source; and Optimizing reflection using techniques such as designing a reflector to provide a uniform asymmetric pattern. In one example, most reflected light is directed to a relatively small portion of the target billboard plane, while direct lighting is provided to a relatively large area of the billboard; and Maintaining economies of scale by using the same reflector design for various size billboards, including 8 foot high, 10 foot high, and 14 foot high. A common reflector may be provided and positioned at different distances from billboards to achieve the different projection sizes; and Providing an adjustable bracket for varying mounting distance and angle as well as providing simple and reliable methods for aligning the reflectors (the housings) properly. In one example, this alignment is obtained by using a simple pair of strings from the top and bottom of the billboard to the housing, and aligning reference marks on the housings with the strings; and Optimizing refraction using techniques; and Optimizing LED device control.

Method of Construction

In one example, side panels are prepared with seal and alignment features. An outer heat sink is thermally connected to reflector base. An LED Power Supply is mounted to back of Reflector Base. A Reflector Base/Heat-Sink is provided with LED on Reflector held by Glass/Diffuser and sealed by "Silicon Adhesive Seal" installed. A frame is mounted to the Reflector base.

Example Construction of Lighting Module 100 for LED Billboard Replacement Fitting In this example, a high efficiency LED billboard lighting system with four LED modules replaces existing lighting modules. Each lighting module has six heat sink assemblies arranged in two rows. The heat sink assemblies comprise an LED package mounted on a heat sink reflector.

LED Package

In this embodiment, the LED packages include a diode and a first refraction element.

In this embodiment, the LEDs are Citizen Electronics Group co., LTD. CL-L102 series LEDs with a 120 degree viewing angle. Each module has two rows of 3 LEDs for a total of 5 LEDs per module. For 14 foot high billboards, 8 watt LEDs are used; for 10 foot high billboards, 7 watt LEDs are used; and for 8 foot high billboards, 6 watt LEDs are used.

The LEDs provide 140 lumens per watt. By contrast, prior art LED lighting may use 40 lumens per watt, or approximately 170 watts for a light module versus about 50 watts for a module of the current invention The LEDs are typically selected or designed considering light output per watt and light output per cost.

Housing and Reflector Design—Heat Sink Assemblies

Figure 3A:
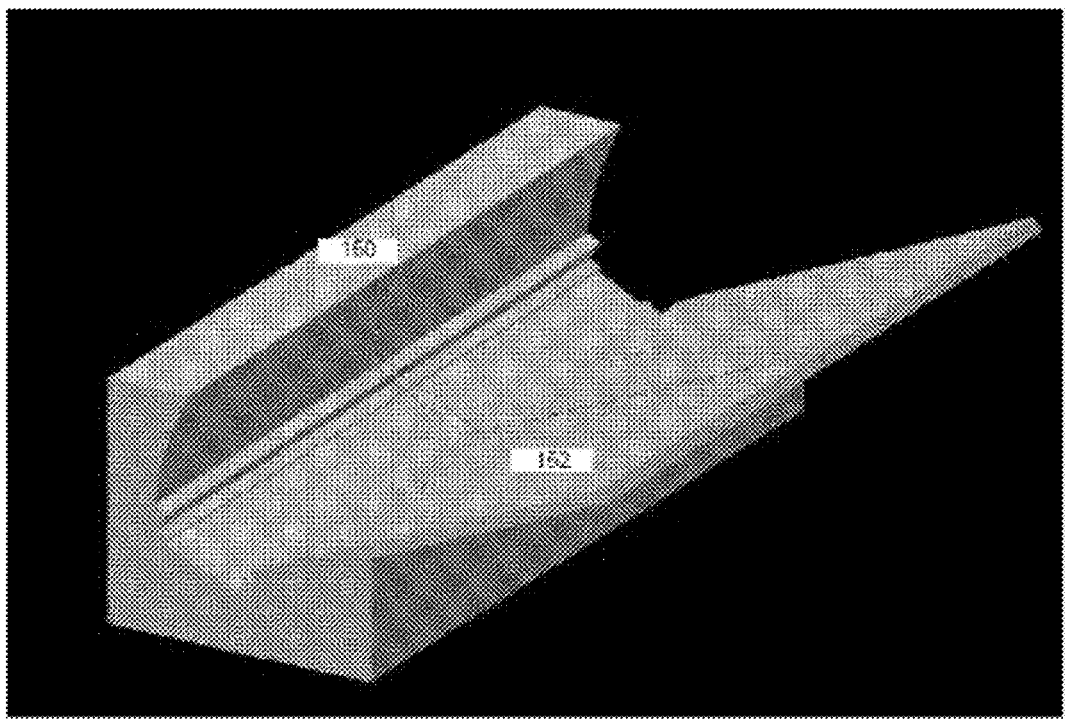
FIG. 3A is a perspective view of a reflector design of one embodiment of the current invention showing a main reflector and an extension plate.

FIG. 3A is a perspective view of a reflector design of one embodiment of the current invention showing a main heat sink reflector 150 and a reflector extension plate 152.

Figure 3B:
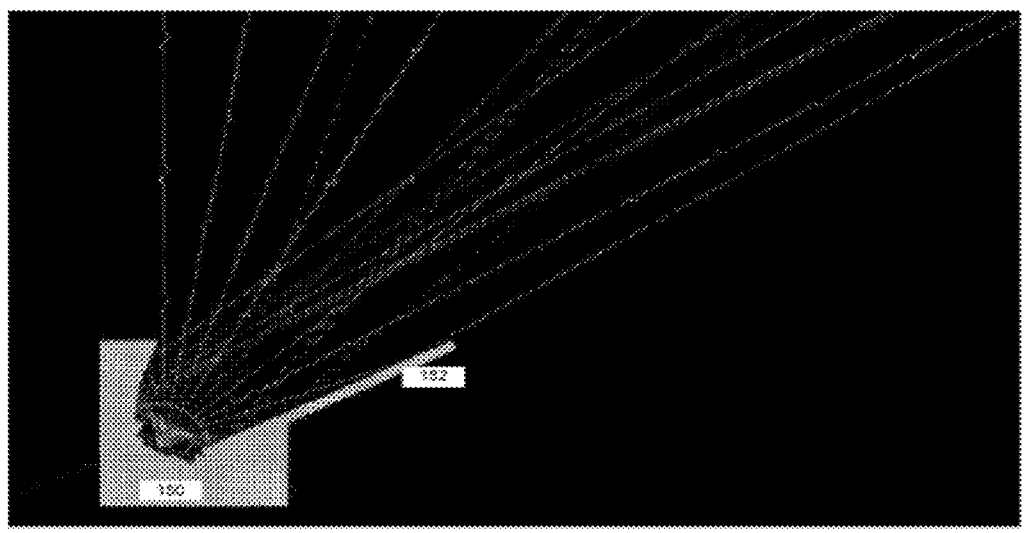
FIG. 3B is a side view of a reflector design of FIG. 3A showing a plurality of representative rays.

FIG. 3B is a side view of the reflector design of FIG. 3A showing a plurality of representative light rays.

In one embodiment, the general construction is an aluminum or copper, welded, extruded, or formed frame housing 120 with either a separate or attached reflector holding plate 130 that acts also as the base to hold the seals, diffuser 260 and reflector 150 in place.

The construction allows for fast assembly and rigid construction, shipping of two units in one container can be achieved without breaking a glass diffuser.

In one example, the reflector is made from either formed, cut and bent, extruded, or cast aluminum 3000 or 6000 series for best heat transfer or any other method of producing a suitable shape.

The reflector may also be made from formed copper that has been coated with a highly reflective material such as chrome or high-bright nickel or stuck on glass or plastic mirrors.

Extension Plate

In this embodiment, a reflector extension plate 152 can be attached to the main reflector in order to extend the reflection area.

In this example, the extension plate extends to both sides of the main reflector. The ends of the extensions may be bent, such as at a 45 degree angle, in order to eliminate light overspill from the sides of the billboard.

Alignment Feature

The housing may include reference marks that permit an easy field alignment of the device as described in the installation section below.

Methods of Installation and Alignment

New or replacement modules are provided to mount on billboards. Alignment marks on the module housing are aligned with strings from the top and bottom of the billboard to quickly establish proper spacing and orientation angle.

Refraction Elements

FIG. 4 is a simplified cross section of an example embodiment. In this example, each of the 4 lighting modules has 6 LEDS, arranged in two rows. In this embodiment, some aspects of the LED include the placement of the diode relatively high in the LED package, a phosphor diffuser having an area approximately 10 times that of the diode, and a flat fine diffusing lens on the LED. Refraction is managed with two refraction elements.

The 6 LEDs per module represents a total of 24 LEDs for the four modules of a 48 foot wide billboard. By contrast, a prior art LED device provides a total of about 1200 LEDs for a 48 foot wide billboard.

FIG. 2 is a side view of an example diffuser clamp.

The first refraction element is a diffuser clamp 250, such as 3/16 inch Industrex™ glass with an upward-facing fine scattering pattern 252. This diffuser clamp serves several functions including clamping the LED in good thermal contact with the housing for thermal management; lessening the "harshness" of the LED light source; reflecting or blocking yellow light which is transmitted out the sides of the LED; and providing a top-side heat sink for the LED. In this example, the diffuser clamp extends past the LED in order to block the yellow light from the sides of the LED.

The second refraction element is a diffusing lens 260, such as 3/16 inch Industrex™ glass that may have a downward-facing fine scattering pattern 262. Orienting this diffusing lens with the fine scattering pattern facing downward reduces the accumulation of dust on the top of the lens. One function of this lens is to reduce the LED harshness.

Relatively thin refraction elements may be used in order to reduce reflection.

What is claimed is:

1. A lighting system comprising:
   a first side lighting system comprising:
   a plurality of lighting modules, each lighting module comprising a housing,
   a plurality of heat sink assemblies, each heat sink assembly comprising:
   a heat sink reflector, wherein said heat sink reflector is designed to provide a uniformly lit surface by an asymmetric pattern,
   at least one LED package mounted with respect to the heat sink reflector, the LED package comprising:
   a diode,
   a first refraction element, and
   a diffusing lens spaced apart from the first refraction element, and a first LED controller
   a programmable current source, wherein the programmable current source is configurable for at least:
   a first LED arrangement;
   a second LED arrangement; and
   a pulse width for producing efficient lighting for a reduced brightness.

2. The lighting system of claim 1 further comprising:
   a second side lighting system comprising:
   a plurality of lighting modules, each lighting module comprising:
   a housing,
   a plurality of heat sink assemblies, each heat sink assembly comprising:
   a heat sink reflector,
   at least one LED package mounted with respect to the heat sink housing, the LED package comprising:
   a diode,
   a first refraction element, and
   a diffusing lens spaced apart from the first refraction element, and a second LED controller.

3. The lighting system of claim 1 further comprising:
   four lighting modules, each lighting module comprising: six LED heat sink assemblies, such that the heat sink assemblies are arranged in two rows in the lighting module.

4. The lighting system of claim 1 further comprising:
   a reflector extension plate attached to each heat sink reflector.

5. The lighting system of claim 1, the LED package further comprises:
   a flat fine diffusing lens positioned over the diode.

6. The lighting system of claim 1, the LED package is substantially larger than the diode.

7. The lighting system of claim 1, the LED package comprising a Citizen Electronics Group Co., LTD. CL-L 102 series LED with a 120 degree viewing angle.

8. The lighting system of claim 1, the LED package provides approximately provide 140 lumens/watt.

9. The lighting system of claim 1, the first refraction element is a diffuser clamp.

10. The lighting system of claim 9, the diffuser clamp comprises 3/16 inch Industrex® glass with an upward-facing fine scattering pattern.

11. The lighting system of claim 1, the first refraction element has an area approximately 10× of the diode.

12. The lighting system of claim 1, further comprising:
    a plurality of additional controllers, such that each lighting module comprises a controller.

13. The lighting system of claim 1, further comprising:
    a communication link between the first LED controller and one of the plurality of additional controllers.

14. The lighting system of claim 1, further comprising:
    a power supply.

15. The lighting system of claim 14, the power supply comprising:
    a 48 volt battery power supply.

16. A method for providing lighting comprising:
    encompassing a lighting module within a housing, said lighting module comprising an LED package, the LED package comprising
    a diode, a first refraction element, a diffusing lens, and a first LED controller;
    emitting light from said LED package;
    controlling light emission of said LED package via a first LED controller, said first LED controller;
    providing a heat sink assembly comprising a heat sink reflector;
    abetting heat generated by said lighting module via the heat sink reflector;
    distributing light across a spectrum via a phosphor diffuser, said phosphor diffuser having an area larger than said light emitting diode area;
    reflecting light from a first area to a target area via a reflection element;
    uniformly lighting a surface
    optimizing refraction by spacing apart the first refraction element from the diffusing lens;
    providing an asymmetric pattern from the diffusing lens; and
    providing a phosphor diffuser area much larger than the diode cross section to improve light capture and reduce point source properties of each LED package.

17. The method of claim 16 further comprising
    communicating from the first LED controller to at least one other controller.

18. The method of claim 16 further comprising
    optimizing junction temperature by replacing an existing non-LED modules with the first side lighting system of claim 16.

19. The method of claim 16 wherein the asymmetric pattern is a uniform asymmetric pattern provided by mirrors deflecting light in unwanted areas of the reflector region and directing those light beams to regions of a billboard.

20. The method of claim 16 further comprising providing, for each module, a power factor corrected, switch mode Power Supply, where the secondary side can be connected directly to a battery to monitor and charge one or more battery, and can run directly from the battery.

* * * * *